J. M. Sanders.
Manufacture of Gas.
Nº 21027.    Patented Jul. 27, 1858.
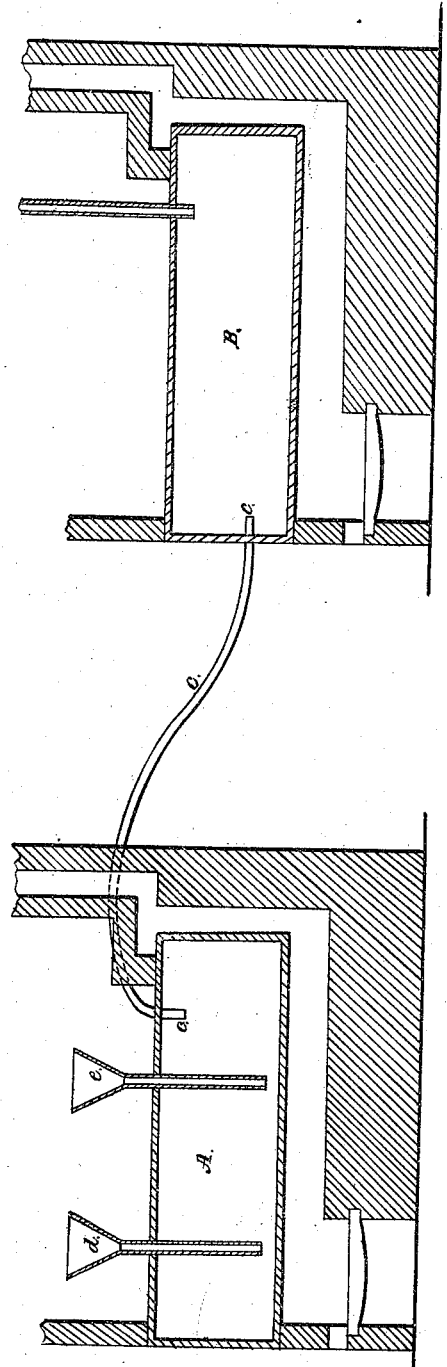

UNITED STATES PATENT OFFICE.

J. MILTON SANDERS, OF CINCINNATI, OHIO.

PRODUCTION OF ILLUMINATING-GAS.

Specification forming part of Letters Patent No. 21,027, dated July 27, 1858; Reissued March 27, 1860, No. 936.

*To all whom it may concern:*

Be it known that I, J. MILTON SANDERS, of Cincinnati, in the county of Hamilton and State of Ohio, have invented a new and useful Improvement in the Manner of Making Illuminating-Gas; and I do hereby declare the following to be a full, clear, and exact description of the same, reference being had to the accompanying drawing, making a part of this specification, which represents in section an apparatus by which the invention can be practically carried out, as will be explained.

The nature of my invention consists in making an illuminating gas, by passing the vapor of water, and a hydro-carbon, previously mixed, into a retort containing carbon, and bringing said retort up to a high-red heat, which produces the gas in question.

To enable others skilled in the art to make and use my invention, I will proceed to describe the same with reference to the accompanying drawing, which is given to illustrate the process.

A is a vessel or boiler, made of sheet iron, or any other suitable metal or material, and it may be furnished with two funnels $d$, and $e$, through which water, and a hydro-carbon such as coal-tar, or spirits of turpentine, or benzole, may be passed or poured into said boiler. Heat, is then applied to the boiler until the water vaporizes, and the mixed vapor of the water and hydro-carbon, may be passed through the tube $c$, into the retort B. It is not necessary that the hydro-carbon should be mixed with the water in the boiler A, but it may be volatilized in a separate vessel, although I prefer the former process.

The retort B, contains any form of carbon such as charcoal, coke, anthracite coal, and the retort with its contents are brought up to a high red heat. The mixed vapors of water and hydro-carbon in passing through and over this heated carbon, are decomposed, the water into its constituent gases. The carbon of the coal shares itself with the gases, converting the oxygen into carbonic oxid, and the hydrogen into light carbureted hydrogen. At the same time the hydro-carbon is decomposed, and a portion of its carbon converts the light carbureted hydrogen ($C_2H_2$,) into heavy carbureted hydrogen (C.H) (illuminating gas). There is likewise given out a trace of carbonic acid.

I have said that any hydro-carbon will answer the purpose to mix with the water vapor, I prefer those existing in large quantities, as in coal tar, in consequence of their greater cheapness. If spirits of turpentine is used, then the following chemical equation will, according to my investigations, illustrate the reactions:

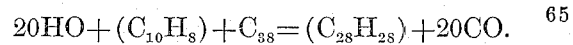
$$20HO + (C_{10}H_8) + C_{38} = (C_{28}H_{28}) + 20CO.$$

By investigating the above, it will be perceived that 20 atoms of water, one atom of spirits of turpentine, and 38 atoms of carbon, are involved in the reaction, producing 28 atoms of heavy carbureted hydrogen (CH) or illuminating gas, and 20 atoms of carbonic acid. The latter gas gives no illumination, but disseminates an intense heat, thereby causing the more intense ignition of the liberated carbon of the illuminating gas; and also rendering this illuminating gas the more valuable for culinary purposes, or for any purpose where heating by gas is required.

The passing of water vapor over red hot carbon, has been done before by chemists, whereby they have obtained light carbureted hydrogen and carbonic oxid, neither of which give any illumination. Some authors, however, say that, they get the light carbureted hydrogen and carbonic acid, and therefore authors disagree in their statements in the results obtained from this process.

Having thus fully described the nature of my invention what I claim therein as new and desire to secure by Letters Patent is—

Carrying the mixed vapors of water and a hydrocarbon formed in the manner herein described into a retort containing carbon at a high red heat, for the purpose of producing an illuminating gas.

J. MILTON SANDERS.

Witnesses:
W. CHIDSEY,
Z. FREEMAN.

[FIRST PRINTED 1911.]